US012789272B2

(12) United States Patent
Itoh

(10) Patent No.: US 12,789,272 B2
(45) Date of Patent: Nov. 10, 2026

(54) END MILL

(71) Applicant: OSG CORPORATION, Toyokawa (JP)

(72) Inventor: Tasuku Itoh, Toyokawa (JP)

(73) Assignee: OSG CORPORATION, Toyokawa (JP)

( * ) Notice: Subject to any disclaimer, the term of this patent is extended or adjusted under 35 U.S.C. 154(b) by 273 days.

(21) Appl. No.: 18/707,172

(22) PCT Filed: Dec. 24, 2021

(86) PCT No.: PCT/JP2021/048138
§ 371 (c)(1),
(2) Date: May 3, 2024

(87) PCT Pub. No.: WO2023/119614
PCT Pub. Date: Jun. 29, 2023

(65) Prior Publication Data
US 2025/0033127 A1 Jan. 30, 2025

(51) Int. Cl.
*B23C 5/10* (2006.01)

(52) U.S. Cl.
CPC .................................... *B23C 5/10* (2013.01)

(58) Field of Classification Search
CPC ....................................................... B23C 5/10
See application file for complete search history.

(56) References Cited

U.S. PATENT DOCUMENTS

2009/0136305 A1* 5/2009 Takiguchi ............... B23C 3/055 408/82
2010/0226726 A1 9/2010 Strasmann
2012/0148352 A1 6/2012 Miki et al.
(Continued)

FOREIGN PATENT DOCUMENTS

CH 675842 A5 11/1990
CN 101784355 A 7/2010
(Continued)

OTHER PUBLICATIONS

International Search Report of PCT/JP2021/048138 mailed Mar. 29, 2022 and English translation thereof.
(Continued)

*Primary Examiner* — Nirvana Deonauth
(74) *Attorney, Agent, or Firm* — Muncy, Geissler, Olds & Lowe, P.C.

(57) ABSTRACT

End mill is provided with outer periphery cutting edges and end cutting edges along spiral flutes. Spiral flutes include first and second flutes. Flute bottom of first flute is with linear portion, R-shaped portion, and gradient portion. The linear portion extends in parallel to axis line O and in straight-line shape, from tool distal end toward rear end side to position separated from the tool distal end by length corresponding to tool outer diameter. The gradient portion is provided to the rear end side, and is inclined straightly toward outer side in radial direction toward the rear end side. The R-shaped portion connects rear end of the linear portion and front end of the gradient portion, and is curved in circular arc shape toward the outer side in the radial direction. Rake angles of the outer periphery and end cutting edges are constant over entire periphery.

6 Claims, 14 Drawing Sheets

(56) References Cited

U.S. PATENT DOCUMENTS

| | | | | |
|---|---|---|---|---|
| 2013/0315681 | A1 * | 11/2013 | Volokh .................... | B23B 51/02<br>407/53 |
| 2014/0205390 | A1 * | 7/2014 | Baba ......................... | B23C 5/10<br>407/54 |
| 2017/0304909 | A1 | 10/2017 | Fukata | |
| 2021/0276109 | A1 | 9/2021 | Kawai | |
| 2022/0250176 | A1 | 8/2022 | Osawa et al. | |

FOREIGN PATENT DOCUMENTS

| | | | |
|---|---|---|---|
| CN | 106794526 | A | 5/2017 |
| CN | 210702775 | U | 6/2020 |
| CN | 113795349 | A | 12/2021 |
| EP | 3812069 | A1 | 4/2021 |
| JP | S60238216 | A | 11/1985 |
| JP | H07171707 | A | 7/1995 |
| JP | 3036343 | B2 | 4/2000 |
| JP | 2013248727 | | 12/2013 |
| WO | 2010102605 | | 9/2010 |
| WO | 2012/111004 | A2 | 8/2012 |
| WO | 2019244361 | | 12/2019 |

OTHER PUBLICATIONS

The extended European search report of the corresponding EP application No. 21969047.6 issued on Oct. 21, 2025.
The office action of the corresponding CN application No. 202180102470.7 mailed Apr. 18, 2026 and English translation thereof.

* cited by examiner

FIG. 7

| END MILL | DISTANCE FROM TOOL DISTAL END | | | | RAKE ANGLE |
|---|---|---|---|---|---|
| | 7 mm POINT | 10 mm POINT | 15 mm POINT | 20 mm POINT | |
| 1 (PRODUCT OF PRESENT INVENTION) | 53% | 53% | 55% | 58% | 6° CONSTANT |
| 101 | 53% | 53% | 53% | 53% | 6° CONSTANT |
| 102 | 57% | 57% | 57% | 57% | 6° CONSTANT |
| 103 | 58% | 58% | 58% | 58% | 6° CONSTANT |
| 104 | 53% | 44.67% | 56.33% | 58% | 6° CONSTANT |

FIG. 9

| END MILL | AXIAL DEPTH OF CUT (mm) | | | | | | | | |
|---|---|---|---|---|---|---|---|---|---|
| | 0.5 | 1 | 2 | 4 | 6 | 8 | 10 | 11 | 12 |
| PRODUCT OF PRESENT INVENTION (UNEQUAL DIVISIONN/UNEQUAL LEAD) | ○ | ○ | ○ | ○ | ○ | ○ | ○ | ○ | △ |
| COMPARATIVE PRODUCT (EQUAL DIVISION/EQUAL LEAD) | ○ | ○ | ○ | ○ | ○ | △ | × | × | × |

FIG. 12

| END MILL | LENGTH OF LINEAR PORTION (mm) | RADIUS R OF R-SHAPED PORTION (mm) | $\theta 5$ (°) | $\theta 6$ (°) |
|---|---|---|---|---|
| A | 10 | 75 | 3 | 3 |
| B | 10 | 75 | 5 | 3 |
| C | 10 | 10 | 3 | 3 |
| D | 10 | 30 | 3 | 3 |
| E | 10 | 50 | 3 | 3 |
| F | 10 | 90 | 3 | 3 |
| G | 10 | 100 | 3 | 3 |

FIG. 13

| END MILL | A | B | C | D | E | F | G |
|---|---|---|---|---|---|---|---|
| CUTTING DURABILITY LENGTH | 120.8 | 131.5 | 2.4 | 13.3 | 95.2 | 102.3 | 37.6 |
| CONVERSION VALUE | 91.9% | 100.0% | 1.8% | 10.1% | 72.4% | 77.8% | 28.6% |
| STATE | WEAR | WEAR | BREAKAGE | BREAKAGE | WEAR | WEAR | BREAKAGE |
| EVALUATION | ○ | ○ | × | × | ○ | ○ | × |

END MILL

TECHNICAL FIELD

The present invention relates to an end mill.

BACKGROUND ART

A roughing end mill used in deep cutting and rough cutting is required to store and discharge a large amount of generated chips. Thus, it is necessary to secure sufficient chip room. When the chip room is enlarged, a tool cross-sectional area decreases. When the tool cross-sectional area decreases, the tool becomes unable to resist bending stress during the cutting, and there is a possibility that breakage will be incurred.

A flute of a tapered end mill disclosed in Patent Literature 1 is provided such that a flute bottom radius becomes smaller from a shank side toward a tool distal end side. The flute bottom radius is a distance between the flute bottom and an axis line. The flute bottom radius changes in a linear manner at a predetermined gradient angle in an axial line direction. The gradient angle changes at a change point determined in advance such that gradient angle at the distal end side is smaller than at the shank side. At the distal end side where the gradient angle is smaller, a core thickness is smaller. As a result, at the distal end side at which the cutting is mainly performed, the chip room can be secured. At the shank side where the gradient angle is larger, the core thickness increases at a larger change ratio the further toward the shank side. Thus, the strength and rigidity of the tapered end mill can be secured.

CITATION LIST

Patent Literature

Patent Literature 1: WO-A1-2019/244361

SUMMARY OF INVENTION

Problems to be Solved by the Invention

When the tapered end mill disclosed in Patent Literature 1 is used for deep cutting or for rough cutting, generated chips are large. As a result, with a gradient of a flute bottom at a tool distal end side, it is not possible to form a chip room that can store and discharge the large chips. Further, a rake angle of a cutting edge becomes gradually smaller in accordance with the gradient of the flute bottom. In this case, there is a problem that a cutting quality with respect to the workpiece deteriorates, and a cutting resistance increases. The reduction in the rake angle causes a shape of the chips to be unstable, and is a factor that invites clogging of the chips.

It is an object of the present invention to provide an end mill capable of improving machining efficiency.

Means for Solving Problem

An end mill according to an aspect of the present invention is an end mill provided with cutting edges along a plurality of spiral flutes spiraling around an axis line. A flute bottom of the spiral flute includes: a linear portion extending parallel to the axis line and in a straight-line shape, from a tool distal end toward a rear end side, to a position separated from the tool distal end by a length corresponding to a tool outer diameter: a gradient portion provided further to the rear end side than the linear portion, and being inclined, in a straight-line shape, toward an outer side in a radial direction the further toward the rear end side from the linear portion side: and an R-shaped portion connecting a rear end of the linear portion and a front end of the gradient portion, and being curved in a circular arc toward the outer side in the radial direction the further toward the gradient portion side from the linear portion side. A rake angle of the cutting edge is constant over an entire periphery of the cutting edge.

The flute bottom of the spiral flute according to the present aspect is provided with the linear portion, and thus a chip storage capacity can be sufficiently secured. Furthermore, the flute bottom of the spiral flute is provided with the gradient portion at the rear end side. The gradient portion is inclined, in the straight-line shape, toward the outer side in the radial direction the further toward the rear end side from the linear portion side. Thus, the flute bottom radius becomes larger toward the rear end side, and the rigidity of the rear end side can be improved. Furthermore, the R-shaped portion is provided between the linear portion and the gradient portion. The R-shaped portion curves in a circular arc toward the outer side in the radial direction the further toward the gradient portion side from the linear portion side. Thus, in the cutting of a workpiece, stress acting on a portion between the linear portion and the gradient portion can be dispersed and received over the whole of the R-shaped portion. In this way, the rigidity of the entire tool can be improved. Further, even when the R-shaped portion and the gradient portion are provided at the flute bottom, the rake angle is constant over the entire periphery of the cutting edge, and thus, a cutting performance with respect to the workpiece can be secured. In these ways, machining at a high cutting performance and high feed with respect to the workpiece is possible with the end mill, and thus, the end mill can improve machining efficiency.

The plurality of spiral flutes of the end mill according to the present aspect may be unequally divided in which, in a front view of the tool distal end, respective flute spacing angles of the two spiral flutes adjacent to each other in a peripheral direction are different from each other, and may have an unequal lead in which respective twist angles of the two spiral flutes adjacent to each other in the peripheral direction are different from each other. In this way, the end mill can suppress self-induced vibrations occurring during cutting of the workpiece.

In the end mill according to the present aspect, as the plurality of spiral flutes, a first flute and a second flute may be provided alternately in the peripheral direction, the first flute and the second flute having different flute spacing angles from each other. A first flute spacing angle of the first flute may be smaller than a second flute spacing angle of the second flute. A flute width at the tool distal end side of the first flute may be narrower than a flute width at the tool distal end side of the second flute. The flute width of the first flute may become gradually wider from the tool distal end side toward the rear end side, and the flute width of the second flute may become gradually narrower from the tool distal end side toward the rear end side. In this way, the end mill can discharge the chips to the rear end side while storing the same amount of chips in the first flute and the second flute. Thus, the end mill can secure a chip discharge performance. Further, even when the end mill has the unequal division and the unequal lead, an interval of the first flute and the second flute can be secured in the peripheral direction.

In the end mill according to the present aspect, a first gradient angle of the gradient portion of the first flute and a second gradient angle of the gradient portion of the second flute may be different from each other. In this way, the end mill can achieve both the chip discharge performance and the improvement in rigidity.

In the end mill according to the present aspect, the tool distal end may be a hemispherical shape, and a nick may be provided at least at the tool distal end side of the cutting edge. In this way, the end mill can reduce contact wear with the workpiece at the same time as being able to improve the chip discharge performance.

In the end mill according to the present aspect, a value of a radius R of the R-shaped portion may be in a range from 50 to 90 mm. In this way, the curved shape of the R-shaped portion can be favorably formed, and the rigidity can be improved. Note that when machining the R-shaped portion, the R-shaped portion can be formed by moving a grindstone along a circular arc trajectory, and the R-shaped portion may be formed with a grindstone diameter of 100 mm to 180 mm when grinding the R-shaped portion, using a machining method transferring that R shape.

BRIEF DESCRIPTION OF DRAWINGS

FIG. 7 is a table showing a flute bottom radius and a rake angle of the five types of end mill.

FIG. 9 is a table showing results of a Test 2.

FIG. 12 is a table showing a length of a linear portion, a radius R of an R-shaped portion, and θ5 and θ6 of seven types of end mill.

FIG. 13 is a table showing results of a Test 4.

DESCRIPTION OF EMBODIMENTS

Figure 1:
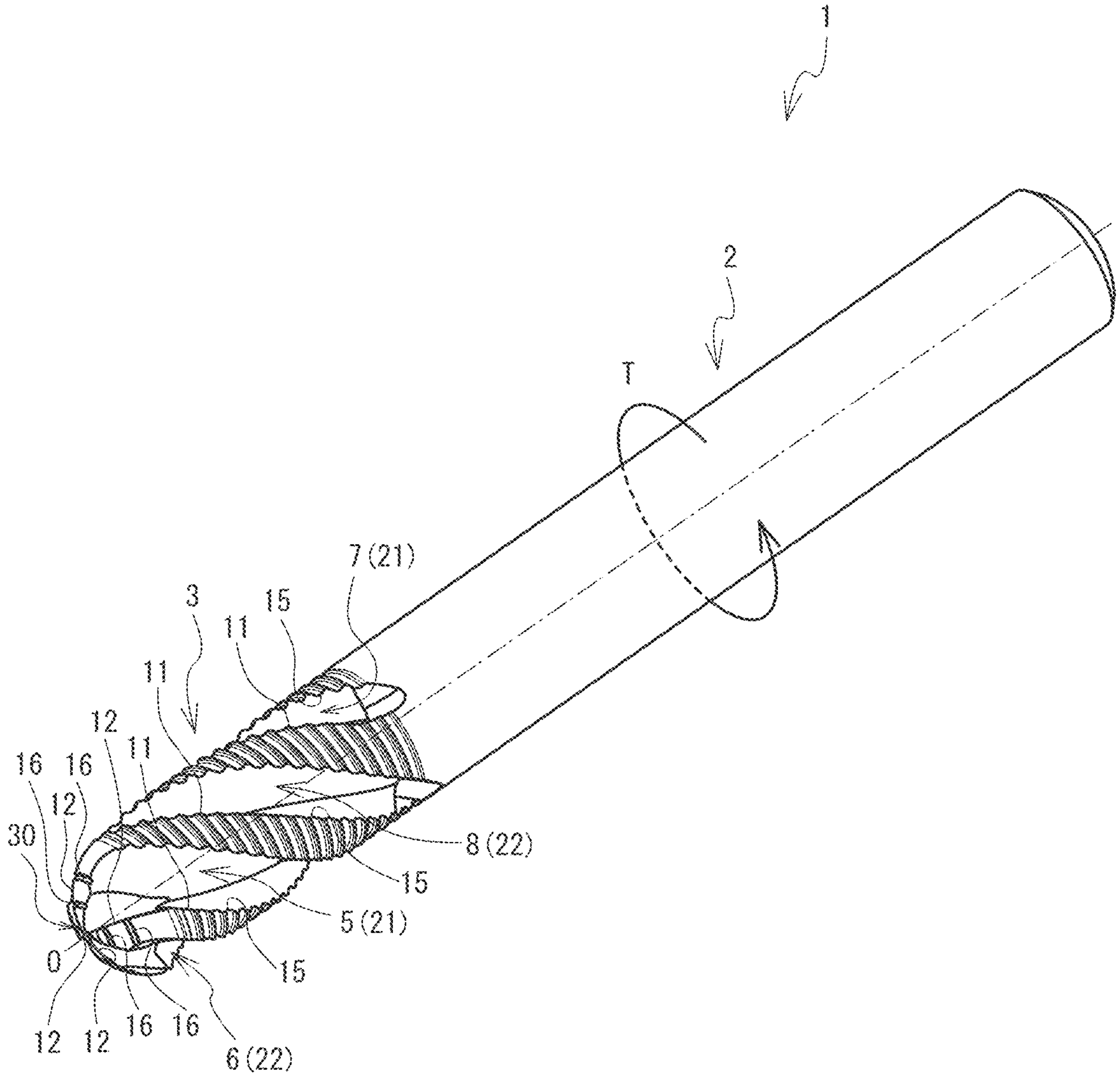
FIG. 1 is a perspective view of an end mill 1

An embodiment of the present invention will be explained. The present invention is not limited to the embodiment described below, and the design can be modified as necessary. For clarity of description, in the drawings, dimensional ratios and angles differing from actual dimensional ratios and angles are illustrated in places.

Figure 2:
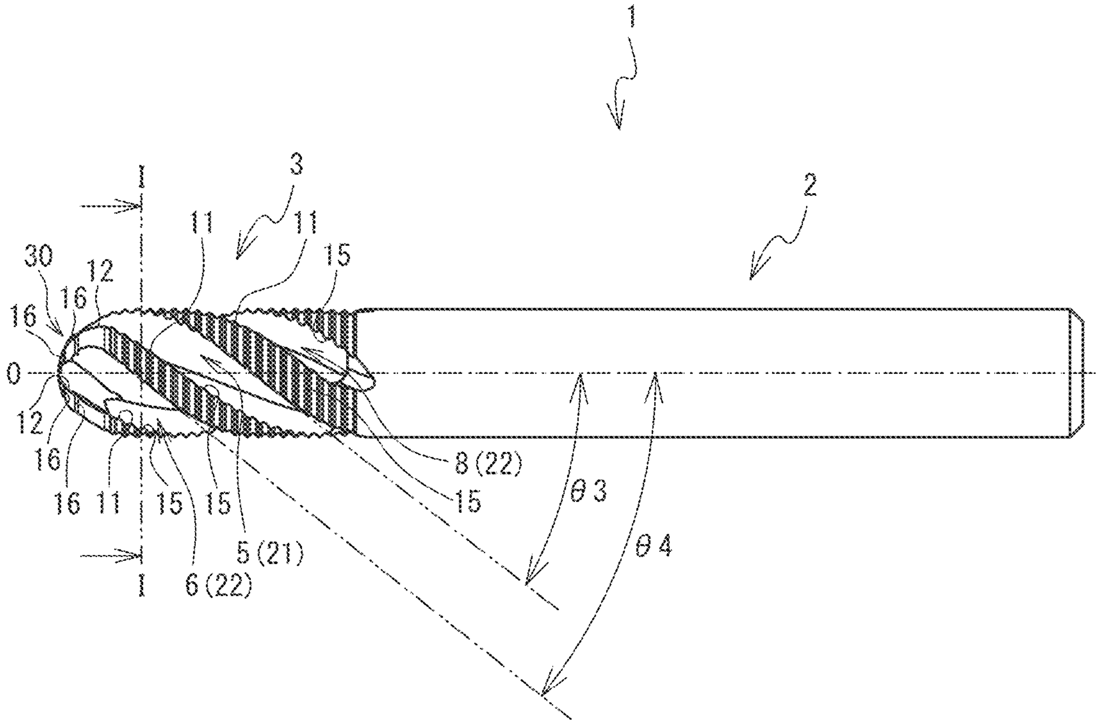
FIG. 2 is a side view of the end mill 1.
Figure 3:
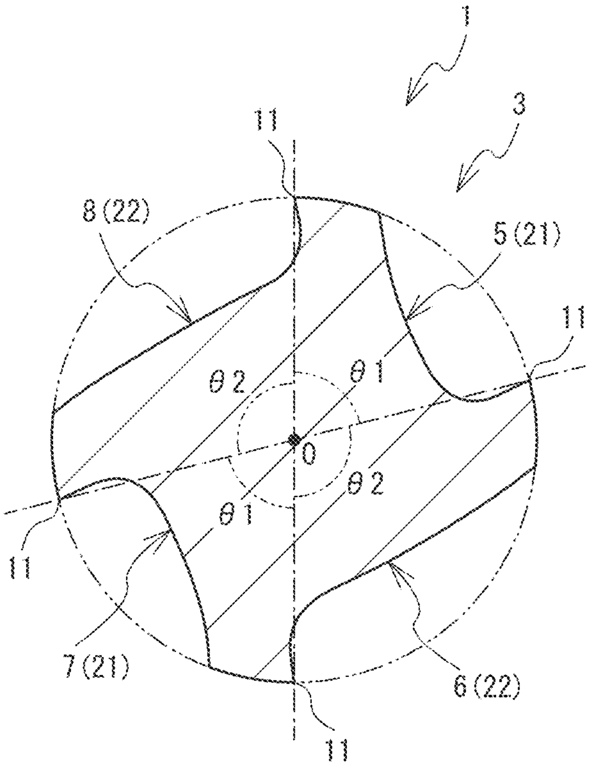
FIG. 3 is a cross-sectional view as viewed in the direction of arrows along a line I-I shown in FIG. 2.

A configuration of a roughing ball end mill 1 (hereinafter referred to as the end mill 1) will be described with reference to FIG. 1 to FIG. 3. The end mill 1 is mainly used in deep cutting and rough cutting. As shown in FIG. 1 and FIG. 2, the end mill 1 is integrally provided with a shank 2 and a cutting portion 3 along an axis line O. The shank 2 is provided at a rear end side of the end mill 1, and the cutting portion 3 is provided at a distal end side of the end mill 1. The shank 2 is a round bar, and is mounted to a main shaft of a machine tool that is not shown in the drawings. The machine tool moves relative to a workpiece in a direction orthogonal to the axis line O, while driving the end mill 1 to rotate in a rightward direction around the axis line O, as viewed from the shank 2 side (refer to an arrow T in FIG. 1 and FIG. 2). In this way, the end mill 1 performs machining of a groove in the workpiece. A base material of the end mill 1 is HSS, though the base material is not limited to this example, and may be coated with a hard coating of cemented carbide, for example. As an example, in the end mill 1, a tool length is 80 mm, a tool diameter is 10 mm, a length of the shank 2 is 57.6 mm, and a length of the cutting portion 3 is 22.4 mm.

The cutting portion 3 has a bar shape coupled to the shank 2 on the axis line O, and a semispherical ball portion 30 is provided at a distal end portion of the cutting portion 3. Four spiral flutes 5 to 8 are provided around the axis line O at the outer peripheral surface of the cutting portion 3. The spiral flutes 5 to 8 twist to the right as viewed from the shank 2 side, and, as will be described later, the spiral flutes 5 to 8 have unequal division and unequal lead. An outer periphery cutting edge 11 is provided along one opening edge of each of the spiral flutes 5 to 8. As a result, the four outer periphery cutting edges 11 are provided at the outer peripheral surface of the cutting portion 3. A rake angle of the outer periphery cutting edge 11 is constant around the whole periphery and is 6°, for example. A plurality of nicks 15 are provided in the outer periphery cutting edge 11. The nicks 15 extend in parallel in a direction intersecting the axis line O.

Four end cutting edges 12 are provided in the ball portion 30. The four end cutting edges 12 are respectively connected to the corresponding four outer periphery cutting edges 11. In a similar manner to the outer periphery cutting edge 11, a rake angle of the end cutting edge 12 is constant around the whole periphery, and is 6°, for example. Two nicks 16 are provided in each of the four end cutting edges 12. The nicks 16 also extend parallel to the direction intersecting the axis line O. Chips cut by the outer periphery cutting edges 11 and the end cutting edges 12 are fragmented by the nicks 15 and 16, and are discharged to the shank 2 side by the spiral flutes 5 to 8 along with a coolant. For this reason, a chip discharge performance is improved, and the end mill 1 can thus perform the machining with a high degree of efficiency.

The unequal division and unequal lead will be described with reference to FIG. 2 and FIG. 3. As shown in FIG. 3, when a cross section of the cutting portion 3 of the end mill 1 is viewed from the tool distal end side, the spiral flutes 5 and 7 face each other with the axis line O interposed therebetween, and the spiral flutes 6 and 8 face each other with the axis line O interposed therebetween. For convenience of description, the spiral flutes 5 and 7 are defined as first flutes 21, and the spiral flutes 6 and 8 are defined as second flutes 22. A flute spacing angle θ1 of the first flutes 21 and a flute spacing angle θ2 of the second flutes 22 are different from each other and thus, the spiral flutes 5 to 8 are unequally divided. For example, the flute spacing angle θ1 is 81°, and the flute spacing angle θ2 is 99°. Since the spiral flutes 5 to 8 are unequally divided, the four outer periphery cutting edges 11 are unevenly disposed in a peripheral direction. For example, the four outer periphery cutting edges 11 are disposed at respective positions of 0°, 81°, 180°, and 261°. In this way, periodic self-induced vibrations are not generated at the time of cutting, and chattering is less likely to occur even if a cutting load becomes high. Furthermore, the chips have a characteristic of being discharged in a scattered manner, and thus, at the time of cutting, clogging of the chips in the spiral flutes 5 to 8 can be suppressed.

As shown in FIG. 2, a twist angle θ3 of the first flutes 21 and a twist angle θ4 of the second flutes 22 are different from each other, and thus, the spiral flutes 5 to 8 have the unequal lead. The twist angles θ3 and θ4 are twist angles with respect to the axis line O. For example, the twist angle θ3 is 40° and the twist angle θ4 is 42°. In the present embodiment, the twist angle θ4 of the second flutes 22 is larger than the twist angle θ3 of the first flutes 21. Due to this unequal lead, at the same time that a direction of a cutting force is changed by the outer periphery cutting edges 11 and the end cutting edges 12, in a similar manner to the unequal division, the self-induced vibrations can be suppressed as a result of the changing of a cycle at which the outer periphery cutting edges 11 and the end cutting edges 12 come into contact with a machining face.

Figure 4:
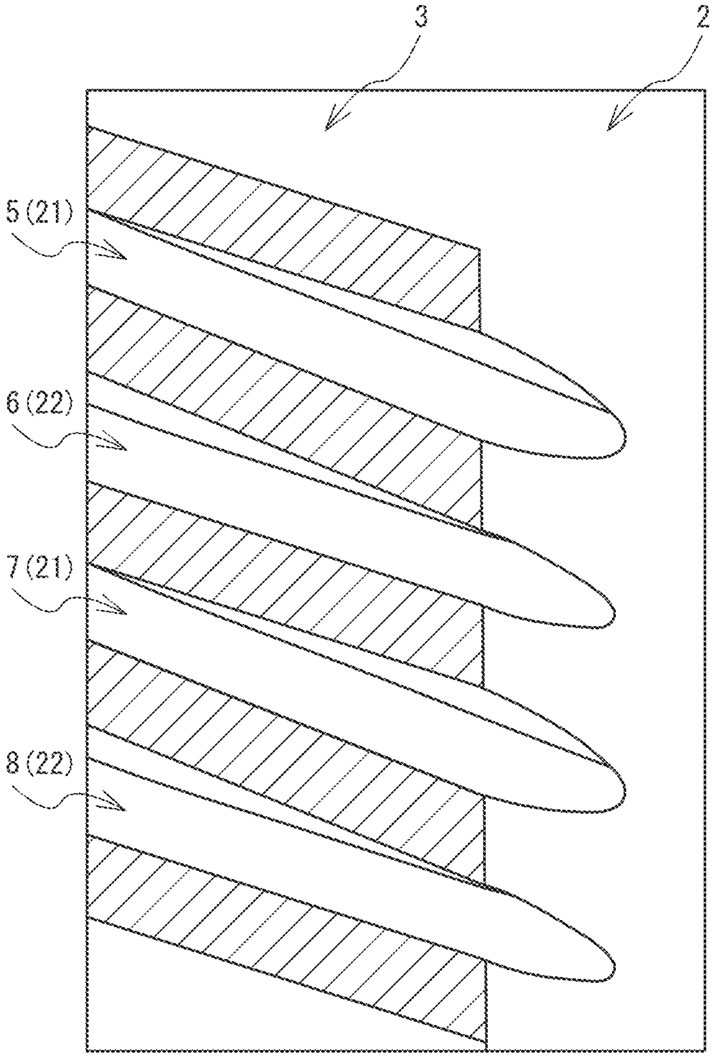
FIG. 4 is a developed view of spiral flutes 5 to 8.

A width of each of the first flutes 21 and the second flutes 22 will be described with reference to FIG. 4. The width of the flute means a length thereof in a direction orthogonal to a lengthwise direction of the flute. The two first flutes 21 and the two second flutes 22 are alternately disposed in the peripheral direction in the outer peripheral surface of the cutting portion 3. As described above, the flute spacing angle θ1 of the first flutes 21 is smaller than the flute spacing angle θ2 of the second flutes 22 (refer to FIG. 3). Thus, at the distal end side (the left side in FIG. 4) of the cutting portion 3, the width of the first flute 21 is narrower than the width of the second flute 22, and the width of the second flute 22 is wider than the width of the first flute 21. The width of the first flute 21 becomes gradually wider toward the shank 2 side, while, in reverse to the first flute 21, the width of the second flute 22 becomes gradually narrower toward the shank 2 side. Thus, at the shank 2 side of the cutting portion 3, the width of the first flute 21 is wider than the width of the second flute 22, and the width of the second flute 22 is narrower than the width of the first flute 21.

Figure 5:
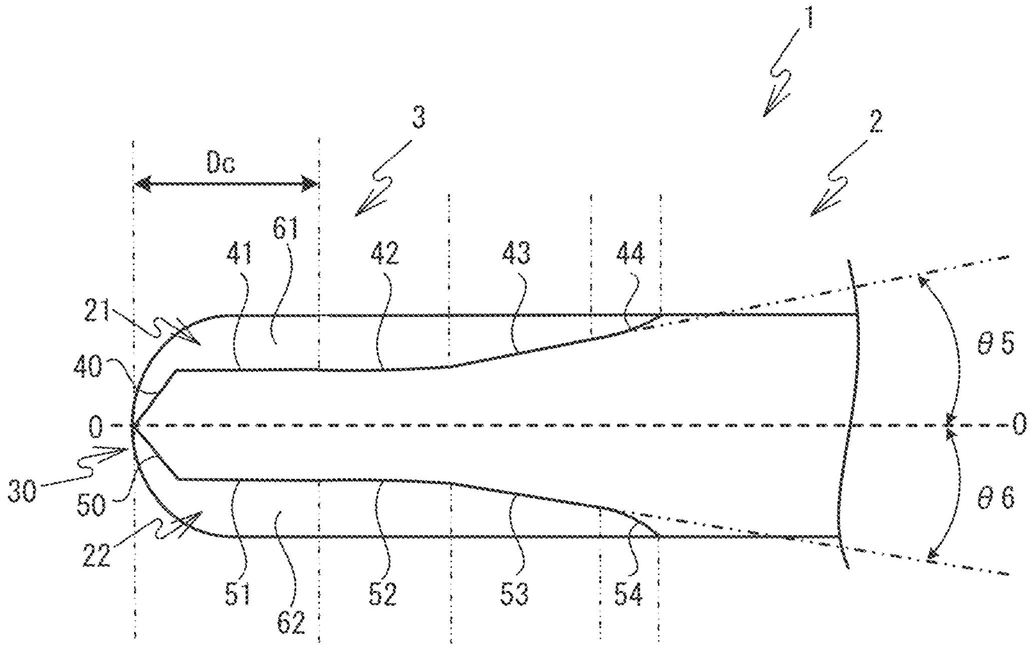
FIG. 5 is an image view of a cross-section along an axis line O of the end mill 1.

A flute bottom shape of each of the first flutes 21 and the second flutes 22 will be described with reference to FIG. 5. FIG. 5 is a cross-sectional view of the end mill 1 along the axis line O, and in order to make the flute bottom shape of the first flute 21 and the second flute 22 easy to understand, FIG. 5 is an image view in which the first flute 21 and the second flute 22 are extended in parallel to the axis line O.

The flute bottom of the first flute 21 is provided with a linear portion 41, an R-shaped portion 42, a gradient portion 43, and a rounded off portion 44, in order from the tool distal end side toward the shank 2 side. The linear portion 41 is provided at the distal end side of the cutting portion 3, and is a portion parallel to the axis line O from the tool distal end side by an outer diameter Dc. The outer diameter Dc is a tool diameter (diameter) of the end mill, and is 10 mm, for example. Note that a widened diameter portion 40 is provided at the tool distal end side. The diameter of the widened diameter portion 40 expands in a tapered shape, or in a curved shape conforming to the tapered shape, from the tool distal end side toward the shank 2 side, and is connected to a front end of the linear portion 41. A length of the widened diameter portion 40 may be designed in accordance with the tool diameter. For example, a flute bottom diameter ratio of the linear portion 41 is 53%. The flute bottom diameter ratio is a ratio of the flute bottom diameter with respect to the tool diameter. A large chip room 61 is formed in a portion of the first flute 21 corresponding to the linear portion 41.

The gradient portion 43 is provided further to the shank 2 side than an intermediate portion in the lengthwise direction of the cutting portion 3, and is a gradient section that is linearly inclined such that the flute bottom radius increases toward the shank 2 side. An example of a gradient angle θ5 of the gradient portion 43 with respect to the axis line O is 5°. The R-shaped portion 42 is a section that smoothly connects, in an arc shape, the rear end of the linear portion 41 and the front end of the gradient portion 43. The R-shaped portion 42 is curved in the arc shape such that the flute bottom radius gently increase from the rear end of the linear portion 41 toward the front end of the gradient portion 43. As an example, the flute bottom diameter ratio at the rear end of the R-shaped portion 42 is 55%. Note that a known disc-shaped grindstone is used to grind the R-shaped portion 42, for example. The gentle arc-shaped R-shaped portion 42 can be formed by causing the grindstone to come into contact with a base material of a tool that rotates at high speed, or by moving the grindstone along an arc-shaped trajectory. The rounded off portion 44 is a section caused to end in an arc shape along the tool surface from the rear end of the gradient portion 43.

Although not described in detail later, in a similar manner to the flute bottom of the first flute 21, the flute bottom of the second flute 22 is also provided with a widened diameter portion 50, a linear portion 51, an R-shaped portion 52, a gradient portion 53, and an end portion 54, in order from the tool distal end side toward the shank 2 side. A large chip room 62 is formed in a portion of the second flute 22 corresponding to the linear portion 51. As an example, a gradient angle θ6 of the gradient portion 53 with respect to the axis line O is 3°. The gradient angles θ5 and θ6 of the present embodiment are different from each other, but may be the same as each other.

A chip discharge performance and rigidity when cutting a workpiece using the end mill 1 will be described with reference to FIG. 5. For example, in the case of cutting a notch when making a deep cut, such as when cutting a groove, since a normal cutting depth is equal to or less than the outer diameter Dc, a storage capacity for large chips is demanded at the distal end side of the end mill 1. As described above, in the first flutes 21 and the second flutes 22, the large chip rooms 61 and 62 are provided at the sections corresponding to the linear portions 41 and 51. The chip rooms 61 and 62 can store the large chips generated at the tool distal end side, and thus, the chips are favorably discharged to the shank 2 side. In this way, the end mill 1 can inhibit the clogging of the chips in the first flutes 21 and the second flutes 22.

Then, while the flute bottom radius of the linear portions 41 and 51 of the first flutes 21 and the second flutes 22 is small, the flute bottom radius of the gradient portions 43 and 53 becomes gradually larger toward the shank 2 side. As a result, the end mill 1 can improve the rigidity of the shank 2 side, compared to an end mill in which the linear portions 41 and 51 of the first flutes 21 and the second flutes 22 are extended to the shank 2 side. Thus, the end mill 1 can improve the rigidity at the shank 2 side of the cutting portion 3 while also improving the chip discharge performance of the first flutes 21 and the second flutes 22.

Further, in the end mill 1, the linear portions 41 and 51 are not directly connected to the gradient portions 43 and 53, but are indirectly connected via the R-shaped portions 42 and 52. If the linear portions 41 and 51 and the gradient portions 43 and 53 are directly connected, for example, the flute bottom radius rapidly changes at a connection section between the linear portions 41 and 51 and the gradient portions 43 and 53. In this case, when cutting the workpiece, a large load is applied to the connection section at which the flute bottom radius rapidly changes, and there is a possibility of breakage at this connection section. The end mill 1 smoothly connects the linear portions 41 and 51 and the gradient portions 43 and 53 using the R-shaped portions 42 and 52, and thus, the flute bottom radius gently increases from the linear portions 41 and 51 toward the gradient portions 43 and 53. In this way, the load is dispersed over the whole of the R-shaped portions 42 and 52 at the time of cutting the workpiece, and thus, the breakage can be effectively suppressed.

Note that, as will be described later, machining of the R-shaped portions 42 and 52 is performed by causing the disc-shaped grindstone to come into contact with the base material that is rotating at high speed. Since the R-shaped portions 42 and 52 have the curved shape, a size of a radius R (the R dimension) at that time is preferably 50 (mm) to 90 (mm). For example when the size of R is greater than 90 (mm), since the R-shaped portions 42 and 52 extend to the shank 2 side, the front ends of the gradient portions 43 and 53 move to the shank 2 side and the rigidity deteriorates. Conversely, when the size of R is smaller than 50 (mm), the R-shaped portions 42 and 52 have a small curve, and thus, concentration of stress is more likely to occur, and at the same time, the small curve becomes an obstacle to the chips being smoothly discharged to the shank 2 side along the first flutes 21 and the second flutes 22. Thus, it is preferable that the R-shaped portions 42 and 52 be ground using a grindstone that can process the R-shaped portions 42 and 52 within a range of the size of R being 50 (mm) to 90 (mm) (a grindstone having a grindstone diameter of 100 mm to 180 mm when machining the R-shape using the grindstone radius for transfer).

Further, in the end mill 1, even if the gradient portions 43 and 53 are provided in the first flutes 21 and the second flutes 22, the rake angle is constant at any position of the outer periphery cutting edge 11 (6°, for example). As a result, a cutting quality with respect to the workpiece can be improved, and cutting resistance can be reduced. Further, since the chip shape is stable, it is possible to inhibit clogging of the chips in the first flutes 21 and the second flutes 22.

Further, the gradient angle θ5 of the gradient portion 43 of the first flute 21 having the larger width at the shank 2 side is larger than the gradient angle θ6 of the gradient portion 53 of the second flute 22 having the smaller width at the shank 2 side. By causing the gradient angles θ5 and θ6 to be different from each other in this way, as shown by results of a Test 4 to be described later, the rigidity of the cutting edge 3 can be further improved, compared to when the gradient angles θ5 and θ6 are the same as each other.

Figure 6:
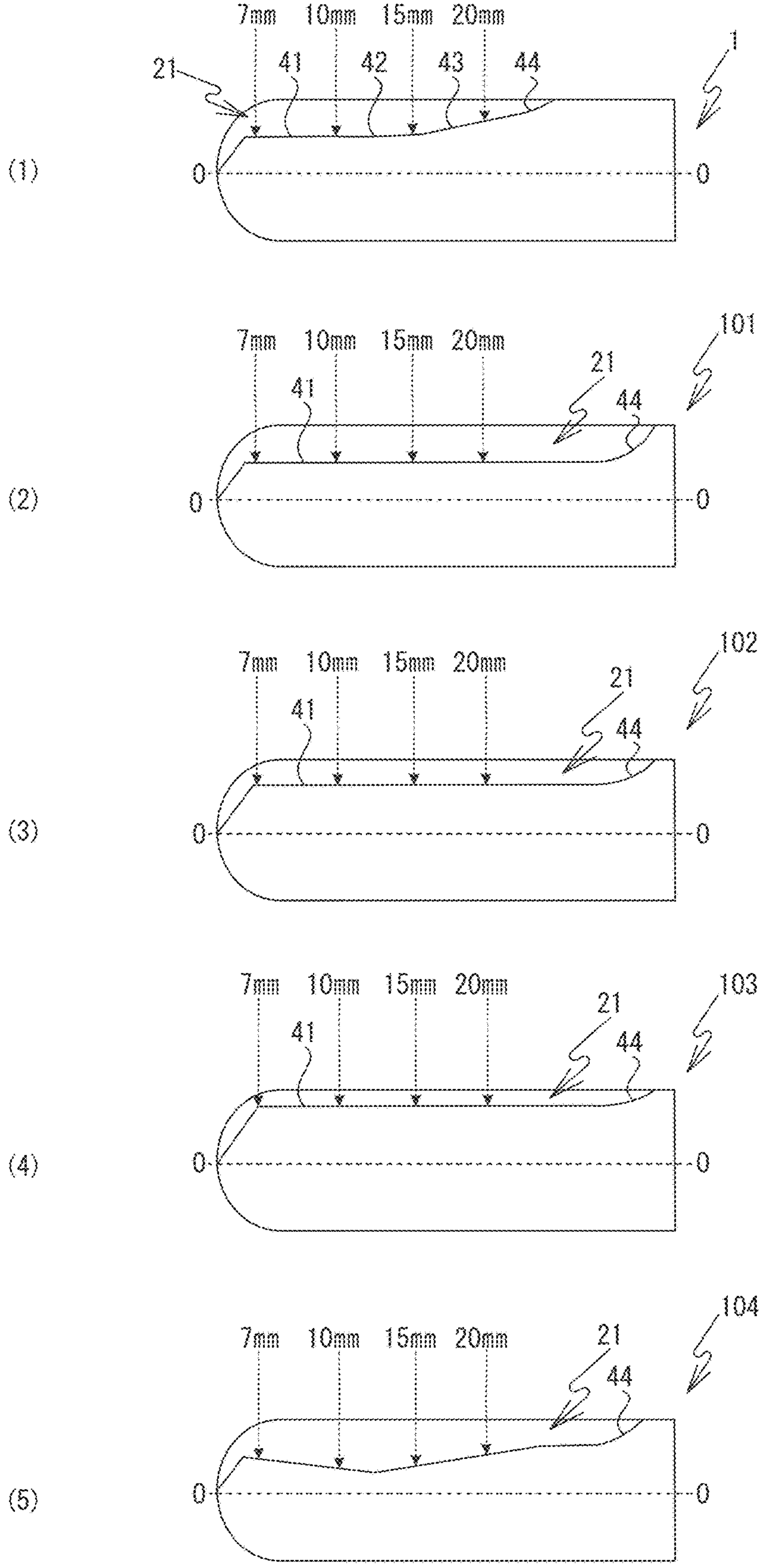
FIG. 6 is a series of views comparing shapes of a first flute 21 of five types of end mill.

Subsequently, a Test 1 was performed to verify the effects of the flute bottom shape of the first flutes 21 and the second flutes 22. As shown in FIG. 6, in Test 1, tool life was investigated when cutting the workpiece, for the end mill 1 that is the product according to the present invention, and for end mills 101 to 104 that are comparative products. The tool life was judged using a cutting durability length (m). The cutting durability length was a length at which Vb (a peripheral flank wear width) became 0.5 mm or breakage occurred. The end mills 101 to 104 are products in which the flute bottom shape of each of the first flute 21 and the second flute 22 is changed. Note that, in FIG. 6, for ease of understanding, only the flute bottom shape of the first flute 21 is described.

In the end mill 101, the linear portion 41 of the end mill 1 extends to the shank 2 side, and the linear portion 41 is rounded off by the rounded off portion 44. In the end mill 102, the flute bottom of the linear portion 41 of the end mill 101 is caused to be shallower. In the end mill 103, the flute bottom of the linear portion 41 of the end mill 102 is caused to be even shallower. In the end mill 104, the shape of the flute bottom is changed to a zigzag shape. For all of the end mills 1 and 101 to 104, the tool diameter is 10 mm, and the number of blades is four.

The flute bottom diameter ratio at each of positions of the end mills 1 and 101 to 104 will be described. As shown in FIG. 7, for each of the end mills 1 and 101 to 104, the flute bottom diameter ratio was measured at four points separated from the tool distal end by 7 mm, 10 mm, 15 mm, and 20 mm. The flute bottom diameter ratio is represented by a ratio of the flute bottom diameter to the tool diameter (%). In the end mill 1, the flute bottom diameter ratio was 53% at the 7 mm point, the flute bottom diameter ratio was 53% at the 10 mm point, the flute bottom diameter ratio was 55% at the 15 mm point, and the flute bottom diameter ratio was 58% at the 20 mm point. Note that the 7 mm point corresponds to a position of the distal end side of the linear portion 41, the 10 mm point corresponds to a position of the rear end of the linear portion 41, the 15 mm point corresponds to a position of a start end of the gradient portion 43, and the 20 mm point corresponds to a position further to the rear end side than an intermediate portion in the lengthwise direction of the gradient portion 43.

In the end mill 101, the flute bottom diameter ratio was 53% at all of the 7 mm point, the 10 mm point, the 15 mm point, and the 20 mm point. In the end mill 102, the flute bottom diameter ratio was 57% at all of the 7 mm point, the 10 mm point, the 15 mm point, and the 20 mm point. In the end mill 103, the flute bottom diameter ratio was 58% at all of the 7 mm point, the 10 mm point, the 15 mm point, and the 20 mm point. In the end mill 104, the flute bottom diameter ratio was 53% at the 7 mm point, the flute bottom diameter ratio was 44.67% at the 10 mm point, the flute bottom diameter ratio was 56.33% at the 15 mm point, and the flute bottom diameter ratio was 58% at the 20 mm point. Note that the rake angle of the outer periphery cutting edge 11 of each of the end mills 1 and 101 to 104 was 6°.

Cutting conditions will be described. Stainless steel (SUS304) was used as the workpiece. A groove was cut with a cutting speed of 80 m/min, a rotation speed of 2547 $min^{-1}$, a feed rate of 1019 mm/min, an axial depth of cut of 10 mm and a width of 10 mm. Note that the feed rate means a speed at which a table to which the workpiece is fixed moves relative to the tool mounted to the drive shaft of the machine tool (not shown in the drawings).

Figure 8:
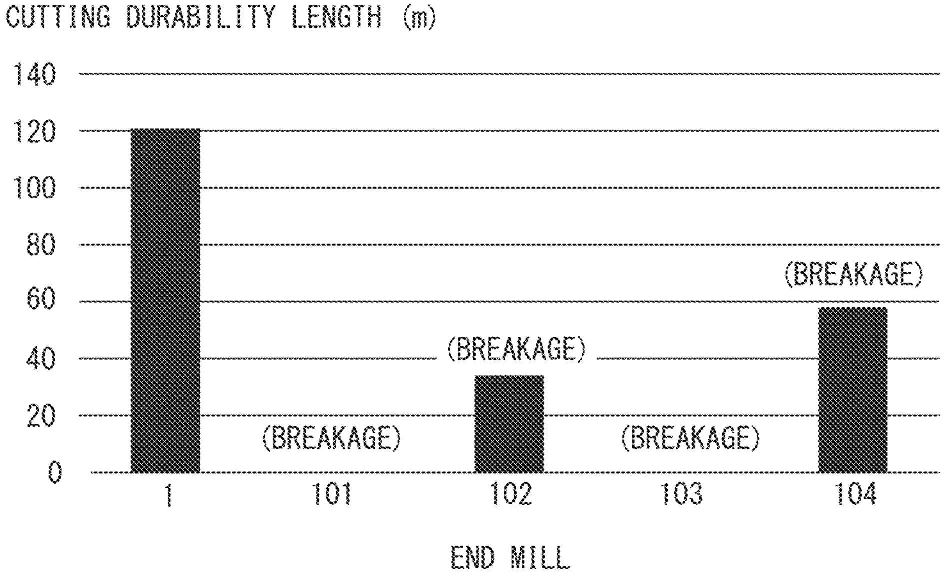
FIG. 8 is a graph showing results of a Test 1.

Results of Test 1 will be described with reference to FIG. 8. The end mill 1 that is the product according to the present invention had a tool life length (m) of 120.8. The tool life length (m) of the end mill 101 was 0.1, and the end mill 101 broke while cutting the workpiece. The tool life length (m) of the end mill 102 was 34, and the end mill 102 broke while cutting the workpiece. The tool life length (m) of the end mill 103 was 0.1, and the end mill 103 broke while cutting the workpiece. The tool life length (m) of the end mill 104 was 58, and the end mill 104 broke while cutting the workpiece. Taking these results into consideration, it is conceivable that, in the end mill 101, since the linear portion 41 extends to the shank 2 side, the rigidity of the shank 2 side decreased and the breakage occurred. In the end mill 102, the rigidity was slightly improved due to the flute bottom diameter ratio being larger than in the end mill 101, but compared to the end mill 1, the tool life length (m) was shorter, due to the rigidity being lower than in the end mill 1. In the end mill 103, it is conceivable that, due to the flute bottom diameter ratio being even larger and the chip room becoming narrower, the chips became clogged in the first flutes 21, and resulted in the breakage. In the end mill 104, the tool life length (m) was longer than that of the end mills 101 to 103, but was significantly shorter than that of the end mill 1. It is conceivable that since the flute bottom had the zigzag shape, the chips became caught up on the flute bottom and became clogged, resulting in the breakage.

From the above-described results, the tool life length (m) of the end mill 1 that is the product according to the present invention was longest, and it is thus understood that with the product according to the present invention, the rigidity can be secured while improving the chip discharge performance in the first flutes 21.

Subsequently, a Test 2 was performed to verify the effects of the unequal division and unequal lead. In Test 2, a maximum cutting amount in the workpiece was investigated for the end mill 1 that is the product according to the present invention and for an equal division and equal lead end mill that is a comparative product. Note that, for both the product according to the present invention and the comparative product, the tool diameter is 10 mm, and the number of blades is four.

The cutting conditions will be described. Stainless steel (SUS304) was used as the workpiece. A groove was cut with a cutting speed of 80 m/min, a rotation speed of 2547 $min^{-1}$, a feed rate of 1019 mm/min, and a width of 10 mm. The maximum cutting amount was investigated by implementing 9 patterns of axial depth of cut, namely, 0.5 mm, 1 mm, 2 mm, 4 mm, 6 mm, 8 mm, 10 mm, 11 mm, and 12 mm. Then, a state of the tool when each of the axial depths of cut were cut was evaluated using three levels of “O”, “Δ”, and “X”.

The results of Test 2 will be described with reference to FIG. 9. With the comparative product, for the axial depths of cut of 0.5 to 6 mm, there was no significant vibration and the machining was possible, so the judgment was “O”. On the other hand, at the axial depth of cut of 8 mm, although the machining was possible, vibrations occurred and thus the judgment was “Δ”. Further, for the axial depths of cut of 10 mm and above, the end mill broke during the cutting and the judgment was thus “X”. The comparative product has the equal division and the equal lead, and thus, shaking occurred during the cutting, and the larger the axial depth of cut, the greater the shaking became. It was thus understood that the maximum cutting amount of the comparative product is 6 mm.

In contrast to this, in the product according to the present invention, for the axial depths of cut of 0.5 to 11 mm, there was no significant vibration and the machining was possible, so the judgment was “O”. On the other hand, at the axial depth of cut of 12 mm, although the machining was possible, vibrations occurred and thus the judgment was “Δ”. The product according to the present invention has the unequal division and the unequal lead, and it was understood that it is possible to effectively suppress shaking from occurring during the machining. However, above the axial depth of cut of 11 mm, the size of the chips becomes even larger, and it is conceivable that the vibrations occurred due to a significant load acting on the end mill 1. Thus, it was understood that the maximum cutting amount of the product according to the present invention is 11 mm.

From the above-described results, since the maximum cutting amount of the product according to the present invention was larger than the maximum cutting amount of the comparative product, it was understood that the shaking can be effectively suppressed in the product according to the present invention that is the product with the unequal division and unequal lead.

Subsequently, a Test 3 was performed to verify the effects of causing the rake angle to be constant. In Test 3, the end mill 1 that is the product according to the present invention and an end mill having a rake angle that changes in accordance with the gradient of the flute bottom, as the comparative product, were prepared, and a maximum value and an average value of a cutting resistance (N) were investigated when a cutting depth was changed. Note that, of the comparative product, apart from the configuration in which the rake angle changes in accordance with the gradient of the flute bottom, the configuration is the same as that of the product according to the present invention.

The cutting conditions will be described. The tool diameter of both the product according to the present invention and the comparative product is φ20 (R10) mm. Prehardened steel (40HRC) was used as the workpiece. A groove was cut with a cutting speed of 100 m/min, a rotation speed of 1590 $min^{-1}$, a feed rate of 450 mm/min, and a width of 10 mm. The cutting resistance (N) was measured when changing an axial depth of cut AP from 0.3D to 1.0D, and the maximum value and the average value were investigated. Note that D is the tool diameter.

Figure 10:
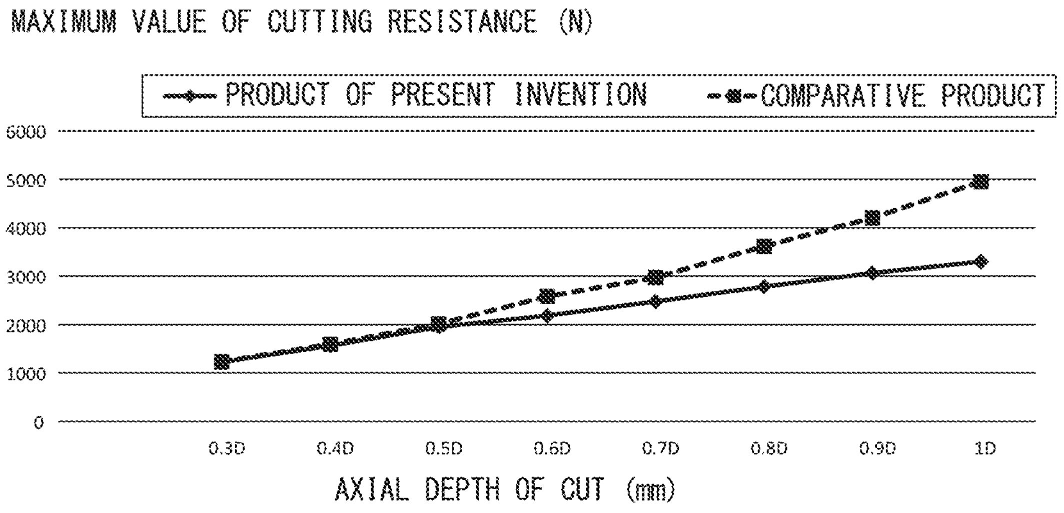
FIG. 10 is a graph showing results of a Test 3-1.
Figure 11:
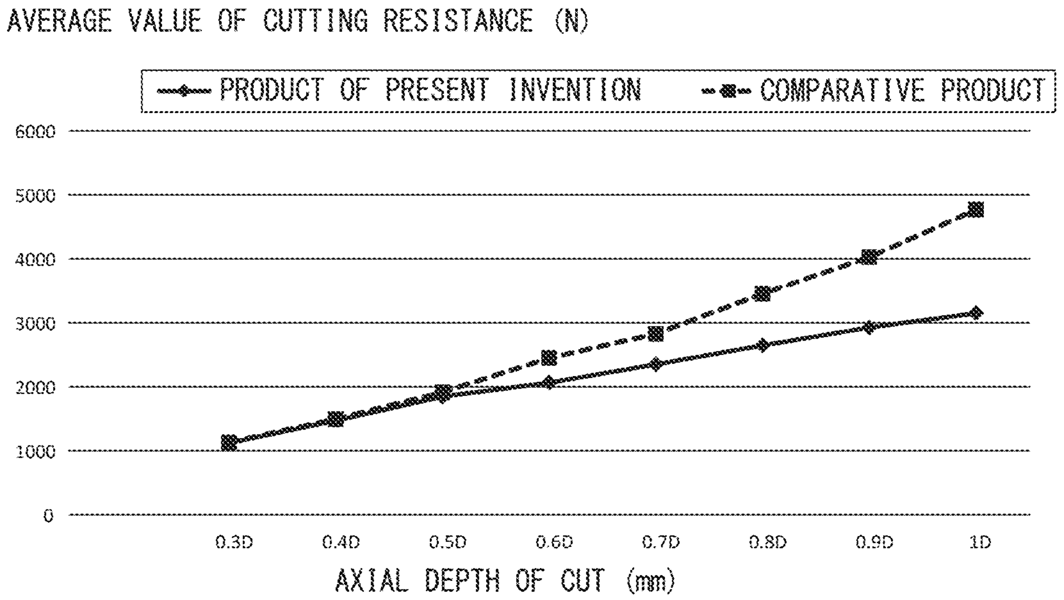
FIG. 11 is a graph showing results of a Test 3-2.

The results of Test 3 will be described with reference to FIG. 10 and FIG. 11. First, changes in the maximum value of the cutting resistance will be described. As shown in FIG. 10, in the comparative product, the maximum value was 1230 when AP=0.3D, the maximum value was 1590 when AP=0.4D, the maximum value was 2011 when AP=0.5D, the maximum value was 2580 when AP=0.6D, the maximum value was 2971 when AP=0.7D, the maximum value was 3615 when AP=0.8D, the maximum value was 4201 when AP=0.9D, and the maximum value was 4952 when AP=ID. In this way; the maximum value of the cutting resistance in the comparative product showed a tendency to become higher the greater the cutting depth.

In contrast to this, in the product according to the present invention, the maximum value was 1225 when AP=0.3D, the maximum value was 1565 when AP=0.4D, the maximum value was 1951 when AP=0.5D, the maximum value was 2182 when AP=0.6D, the maximum value was 2476 when AP=0.7D, the maximum value was 2783 when AP=0.8D, the maximum value was 3065 when AP=0.9D, and the maximum value was 3298 when AP=ID. In this way, the maximum value of the cutting resistance in the product according to the present invention showed a tendency to become higher the greater the cutting depth, in a similar manner to the changes in the maximum value of the comparative product. However, compared to the change in the maximum values in the comparative product, particularly from when the cutting depth is 0.5D or more, the rising gradient significantly decreases, and this difference between the products became larger the greater the cutting depth.

The changes in the average value of the cutting resistance will be described. As shown in FIG. 11, in the comparative product, the average value was 1129 when AP=0.3D, the average value was 1494 when AP=0.4D, the average value was 1912 when AP=0.5D, the average value was 2448 when AP=0.6D, the average value was 2826 when AP=0.7D, the average value was 3454 when AP=0.8D, the average value was 4024 when AP=0.9D, and the average value was 4766 when AP=ID. In this way, the average value of the cutting resistance in the comparative product also showed a tendency to become higher the greater the cutting depth.

In contrast to this, in the product according to the present invention, the average value was 1122 when Ap=0.3D, the average value was 1472 when AP=0.4D, the average value was 1846 when AP=0.5D, the average value was 2062 when AP=0.6D, the average value was 2350 when AP=0.7D, the average value was 2646 when AP=0.8D, the average value was 2923 when AP=0.9D, and the average value was 3149 when AP=ID. In this way, the average value of the cutting resistance in the product according to the present invention also showed a tendency to become higher the greater the cutting depth, in a similar manner to the changes in the average value of the comparative product. Then, for the average value of the cutting resistance of the product according to the present invention also, compared to the change in the average values in the comparative product, from when the cutting depth is 0.5D or more, the rising gradient significantly decreases, and this difference between the products became larger the greater the cutting depth.

From the above-described results, it is seen that the maximum value and the average value of the cutting resistance of the product according to the present invention becomes higher the greater the cutting depth, but since the gradients of increase are lower than those of the maximum value and the average value of the comparative product, it was understood that the cutting resistance with respect to the workpiece is reduced as a result of the rake angle of the outer periphery cutting edge 11 being made constant.

Subsequently, a Test 4 was performed to verify the gradient angles θ5 and θ6 of the first flutes 21 and the second flutes 22, and the curved shape of the R-shaped portions 42 and 52. In Test 4, seven types of end mill A to G were prepared, and the tool life was investigated for each by cutting a workpiece. The end mills A and B are the product according to the present invention and the end mills C to G are the comparative products. In Test 4, for the end mills A to G, the length (mm) of the linear portions 41 and 51 of the first flutes 21 and the second flutes 22, the size of the R-shaped portions 42 and 52, the gradient angle θ5 of the gradient portion 43, and the gradient angle θ6 of the gradient portion 53 were respectively prescribed. Note that the length (mm) of the linear portions 41 and 51 is the length from the tool distal end to the respective rear ends of the linear portions 41 and 51 (hereinafter referred to collectively as the linear portion). The respective lengths of the linear portions 41 and 51 are the same as each other.

As shown in FIG. 12, in the end mill A, the length of the linear portion is 10 mm, the size of the R-shaped portion is 75 mm, the gradient angle θ5 is 3°, and the gradient angle θ6 is 3°. In the end mill B, the length of the linear portion is 10 mm, the size of the R-shaped portion is 75 mm, the gradient angle θ5 is 5°, and the gradient angle θ6 is 3°. The only difference between the end mills A and B is the gradient angle θ5. In the end mill C, the length of the linear portion is 10 mm, the size of the R-shaped portion is 10 mm, the gradient angle θ5 is 3°, and the gradient angle θ6 is 3°. In the end mill D, the length of the linear portion is 10 mm, the size of the R-shaped portion is 30 mm, the gradient angle θ5 is 3°, and the gradient angle θ6 is 3°. In the end mill E, the length of the linear portion is 10 mm, the size of the R-shaped portion is 50 mm, the gradient angle θ5 is 3°, and the gradient angle θ6 is 3°. In the end mill F, the length of the linear portion is 10 mm, the size of the R-shaped portion is 90 mm, the gradient angle θ5 is 3°, and the gradient angle θ6 is 3°. In the end mill G, the length of the linear portion is 10 mm, the size of the R-shaped portion is 100 mm, the gradient angle θ5 is 3°, and the gradient angle θ6 is 3°. Note that, for all of the end mills A to G, the tool diameter is 10 mm and the number of blades is four.

The cutting conditions will be described. Stainless steel (SUS304) was used as the workpiece. The cutting speed was 80 m/min, the rotation speed was 2547 $min^{-1}$, the feed rate was 1019 mm/min, the groove width was 10 mm, and the axial depth of cut was 10 mm. The tool life was investigated when groove cutting was performed in a workpiece under these cutting conditions. Note that, in a similar manner to Test 1, the tool life was judged using a cutting durability length (m). The cutting durability length was the length at which Vb (the peripheral flank wear width) became 0.5 mm or breakage occurred. Further, when the cutting durability length of the end mill, of the end mills, for which the cutting durability length was longest is taken as 100%, a conversion value was calculated for the other end mills, and an overall evaluation using the three levels of "O". "Δ", and "X" was made by combining these conversion values and a state of the tool when the cutting durability length was judged. As an evaluation method, the end mill for which the conversion value was 70 to 100% was judged to be "O", the end mill for which the conversion value was 40 to 70% was judged to be "Δ", and the end mill for which the conversion value was 0 to 39% was judged to be "X".

Figure 14:
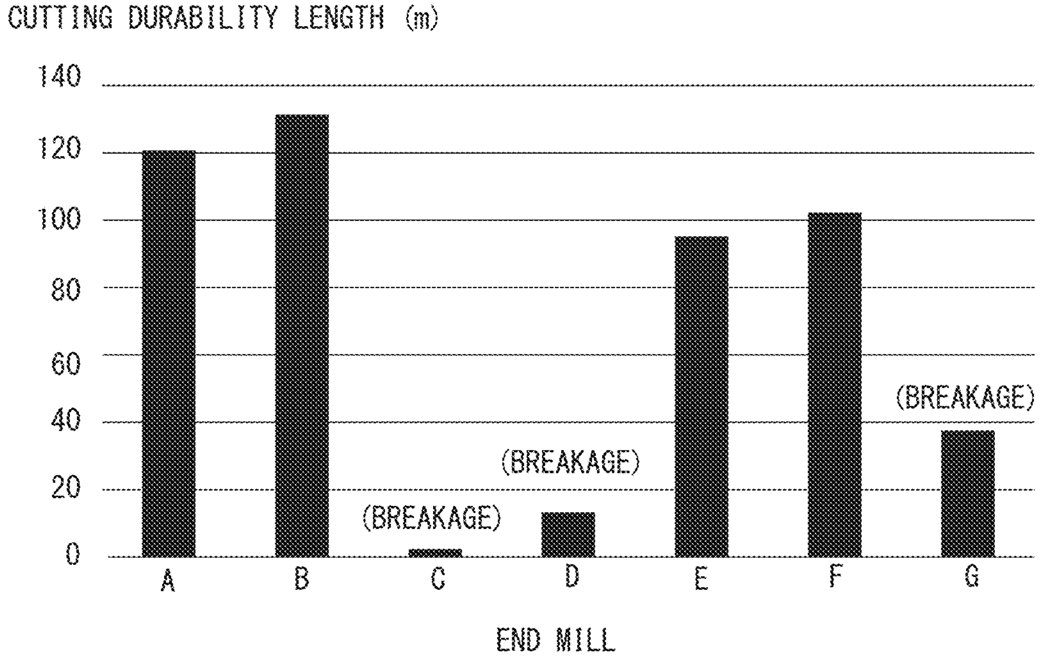
FIG. 14 is a graph showing results of the Test 4.

The results of Test 4 will be described with reference to FIG. 13 and FIG. 14. The cutting durability length of the end mill A was 120.8, the cutting durability length of the end mill B was 131.5, the cutting durability length of the end mill C was 2.4, the cutting durability length of the end mill D was 13.3, the cutting durability length of the end mill E was 95.2, the cutting durability length of the end mill F was 102.3, and the cutting durability length of the end mill G was 37.6. From these results the cutting durability length of the end mill B was the longest. Thus, when the cutting durability length of the end mill B was taken as 100.0%, the conversion value of the end mill A was 91.9%, the conversion value of the end mill C was 1.8%, the conversion value of the end mill D was 10.1%, the conversion value of the end mill E was 72.4%, the conversion value of the end mill F was 77.8%, and the conversion value of the end mill G was 28.6%. With respect to reasons with which the cutting durability length was judged, the end mills A, B, E, and F were worn, and the end mills C, D, and G broke.

Taking into consideration the above-described results, the evaluation of both the end mills A and B was "O", and it was seen that the rigidity can be secured while improving the chip discharge performance using the flute bottom shape of each of the first flutes 21 and the second flutes 22. Further, of the end mills A and B, since the tool life of the end mill B was longer, it was seen that the tool life is extended by causing the gradient angles θ5 and θ6 to be different from each other rather than the same as each other.

The curve of the R-shaped portion will be considered. The respective values of R of the R-shaped portions are changed for the end mills A, and C to G. The greater the value of R, the more gentle and large the circular arc of the R-shaped portion (the R shape) becomes, while the smaller the value of R, the more rapidly small the circular arc of the R-shaped portion becomes. The evaluation of the end mills A, E and F was "O", and the evaluation of the other end mills C, D and G was "X". In other words, with respect to the tool life, the end mill E having the R value of 50 (mm), the end mill A having the R value of 75 (mm), and the end mill F having the R value of 90 (mm) did not break and were worn.

When the R value of the R-shaped portion is small, since the curved form of the R-shaped portion is sharp, the load is more likely to be concentrated. Thus, in the end mills C and D having the small R value, it is conceivable that breakage is more likely to occur at the R-shaped portion. In contrast to this, when the R value is large, since the R-shaped portion is close to a straight line, there is almost no change in the flute bottom radius from the linear portion, and it is not possible to improve the rigidity. Thus, in this case also, it is conceivable that the breakage is likely at the R-shaped portion.

From the above-described results, in the range in which the R value of the R-shaped portion is from 50 (mm) to 90 (mm), it was seen that it is possible for the load acting between the linear portion and the gradient portion to be received over the entire R-shaped portion, and the rigidity can thus be improved.

In the above description, the outer periphery cutting edge 11 and the end cutting edge 12 are an example of a "cutting edge" of the present invention. The flute spacing angle θ1 is an example of a "first flute spacing angle" of the present invention, and the flute spacing angle θ2 is an example of a "second flute spacing angle" of the present invention. The gradient angle θ5 is an example of a "first gradient angle" of the present invention, and the gradient angle θ6 is an example of a "second gradient angle" of the present invention.

As described above, the end mill 1 according to the present embodiment is a roughing end mill for deep cutting and rough cutting in which the outer periphery cutting edges 11 and the end cutting edges 12 are provided along the spiral flutes 5 to 8 spiraling around the axis line O. The flute bottom of each of the spiral flutes 5 to 8 is provided with the linear portion 41 (51), the R-shaped portion 42 (52), and the gradient portion 43 (53). The linear portion 41 extends in parallel to the axis line O and in a straight-line shape from the tool distal end toward the rear end side, to a position separated from the tool distal end by a length corresponding to a tool outer diameter. The gradient portion 43 is provided further to the rear end side than the linear portion 41, and is inclined in a straight-line shape to the outer side in the radial direction the further toward the rear end side from the linear portion 41 side. The R-shaped portion 42 connects the rear end of the linear portion 41 and the front end of the gradient portion 43, and is curved in a circular arc shape to the outer side in the radial direction the further from the linear portion 41 side toward the gradient portion 43 side. Then, the rake angles of the outer periphery cutting edges 11 and the end cutting edges 12 are constant around the whole periphery.

In this way, since the flute bottoms of the spiral flutes 5 to 8 are provided with the linear portions 41, the chip storage capacity can be sufficiently secured. Furthermore, since the gradient portions 43 are provided at the rear end side and the flute bottom radius becomes larger the further toward the rear end side, the rigidity of the rear end side can be improved. Furthermore, the R-shaped portion 42 is provided between the linear portion and the gradient portion, and thus, in the cutting of the workpiece, it is possible to disperse and receive the stress acting between the linear portion 41 and the gradient portion 43 over the whole of the R-shaped portion 42. In this way, the end mill 1 can improve the rigidity of the entire tool. Further, even when the R-shaped portion 42 and the gradient portion 43 are provided at the flute bottom, the rake angles of the outer periphery cutting edge 11 and the end cutting edge 12 are constant over the whole periphery; and thus, a cutting performance with respect to the workpiece can be secured. In these ways, machining at a high cutting performance and high feed with respect to the workpiece is possible with the end mill 1, and thus, the end mill 1 can improve machining efficiency in deep cutting and rough cutting.

Note that the present invention is not limited to the above-described embodiment, and various modifications are possible. The end mill 1 is used for the deep cutting and the rough cutting, but may be used for normal cutting or finishing. The end mill 1 is provided with the four spiral flutes 5 to 8, but it is sufficient that the number of spiral flutes be a plurality, and the number of spiral flutes may be two, or may be four or more. The end mill 1 has the unequal division and the unequal lead, but may have equal division and an equal lead, an unequal division and an equal lead, or an equal division and an unequal lead. The spiral flutes 5 to 8 spiral to the right, but may spiral to the left. The rake angles of the outer periphery cutting edge 11 and the end cutting edge 12 are constant, but need not necessarily be constant. For example, the rake angles may change in accordance with the gradient of the flute bottom of the spiral flutes 5 to 8. It is sufficient that the number of nicks 16 provided in the end cutting edge 12 be at least one, and the number of nicks 16 may be two or more. The number of nicks 15 provided in the outer periphery cutting edge 11 is also not limited.

The invention claimed is:

1. An end mill comprising:

a plurality of spiral flutes spiraling around an axis line, and a plurality of cutting edges respectively extending along the plurality of spiral flutes, wherein each of the plurality of spiral flutes comprises a flute bottom including a linear portion extending parallel to the axis line and in a straight-line shape, from a tool distal end toward a rear end side, to a position separated from the tool distal end by a length corresponding to a tool outer diameter, a gradient portion provided further to the rear end side than the linear portion, and being inclined, in a straight-line shape, toward an outer side in a radial direction the further toward the rear end side from the linear portion side, and an R-shaped portion connecting a rear end of the linear portion and a front end of the gradient portion, and being curved, in a circular arc shape toward the outer side in the radial direction the further toward the gradient portion side from the linear portion side, and a rake angle of each of the plurality of cutting edges is constant over an entire periphery of a respective cutting edge of the plurality of cutting edges.

2. The end mill according to claim 1, wherein the plurality of spiral flutes are unequally divided in which, in a front view of the tool distal end, respective flute spacing angles of the two spiral flutes adjacent to each other in a peripheral direction are different from each other, and the plurality of spiral flutes have an unequal lead in which respective twist angles of the two spiral flutes adjacent to each other in the peripheral direction are different from each other.

3. The end mill according to claim 2, wherein the plurality of spiral flutes includes a first flute and a second flute that are provided alternately in the peripheral direction, the first flute and the second flute having different flute spacing angles from each other, a first flute spacing angle of the first flute is smaller than a second flute spacing angle of the second flute, a flute width at the tool distal end side of the first flute is narrower than a flute width at the tool distal end side of the second flute, the flute width of the first flute becomes gradually wider from the tool distal end side toward the rear end side, and the flute width of the second flute becomes gradually narrower from the tool distal end side toward the rear end side.

4. The end mill according to claim 3, wherein
a first gradient angle of the gradient portion of the first flute and a second gradient angle of the gradient portion of the second flute are different from each other.

5. The end mill according to claim 1, wherein
the tool distal end is a hemispherical shape, and
a nick is provided at least at the tool distal end side of each of the plurality of cutting edges.

6. The end mill according to claim 1, wherein
a value of a radius of the R-shaped portion is in a range from 50 to 90 mm.

* * * * *